United States Patent
Shimura et al.

(10) Patent No.: US 9,034,494 B2
(45) Date of Patent: *May 19, 2015

(54) SECONDARY BATTERY PROTECTING CIRCUIT AND HYBRID POWER SOURCE EQUIPMENT

(71) Applicant: Sony Corporation, Tokyo (JP)

(72) Inventors: Jusuke Shimura, Kanagawa (JP); Atsushi Sato, Kanagawa (JP); Yoshiaki Inoue, Aichi (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/149,977

(22) Filed: Jan. 8, 2014

(65) Prior Publication Data
US 2014/0120381 A1    May 1, 2014

Related U.S. Application Data

(62) Division of application No. 13/113,146, filed on May 23, 2011, now Pat. No. 8,642,193.

(30) Foreign Application Priority Data

May 28, 2010  (JP) ................. 2010-122819

(51) Int. Cl.
| | | |
|---|---|---|
| H01M 14/00 | (2006.01) |
| H02H 7/18 | (2006.01) |
| H01M 10/46 | (2006.01) |
| H01M 10/48 | (2006.01) |
| H02J 7/00 | (2006.01) |
| H02J 7/35 | (2006.01) |
| H01M 16/00 | (2006.01) |

(52) U.S. Cl.
CPC .............. *H02H 7/18* (2013.01); *H01M 10/465* (2013.01); *H01M 10/486* (2013.01); *H02J 7/0026* (2013.01); *H02J 7/35* (2013.01); *H01M 10/48* (2013.01); *H01M 2200/10* (2013.01); *H01M 16/00* (2013.01)

(58) Field of Classification Search
CPC ............ H01M 2/0255; H01M 10/465; H01M 10/425; H01M 2200/00; H01M 2200/10; Y02E 60/128; Y02E 60/122
USPC .................................. 429/7; 320/103; 307/43
See application file for complete search history.

(56) References Cited

U.S. PATENT DOCUMENTS

| | | | |
|---|---|---|---|
| 4,006,397 A * | 2/1977 | Catotti et al. ................. 320/152 |
| 5,738,919 A | 4/1998 | Thomas et al. |
| 8,642,193 B2 * | 2/2014 | Shimura et al. .................... 429/7 |
| 2011/0293970 A1 | 12/2011 | Shimura et al. |

OTHER PUBLICATIONS

Chinese Office Action issued Sep. 1, 2014 in connection with Application No. 2011101382315.

* cited by examiner

*Primary Examiner* — Ula C Ruddock
*Assistant Examiner* — Lisa S Park Gehrke
(74) *Attorney, Agent, or Firm* — Wolf, Greenfield & Sacks, P.C.

(57) ABSTRACT

Disclosed herein is a secondary battery protecting circuit connected in parallel with a nonaqueous secondary battery, the secondary battery protecting circuit including: a first voltage detecting circuit; a second voltage detecting circuit; a switch section; and a heat radiating section.

6 Claims, 3 Drawing Sheets

SECONDARY BATTERY PROTECTING CIRCUIT AND HYBRID POWER SOURCE EQUIPMENT

CROSS REFERENCE TO RELATED APPLICATIONS

The present application claims the benefit under 35 U.S.C. §120 as a divisional application of U.S. patent application Ser. No. 13/113,146, filed May 23, 2011, entitled "SECONDARY BATTERY PROTECTING CIRCUIT AND HYBRID POWER SOURCE EQUIPMENT", which claims priority to Japanese Patent Application No. JP 2010-122819, filed on May 28, 2010, the entire contents of both of which are incorporated herein by reference.

BACKGROUND

The present disclosure relates to a secondary battery protecting circuit and hybrid power source equipment. More particularly, the disclosure relates to a secondary battery protecting circuit for protecting a nonaqueous secondary battery, and hybrid power source equipment including the nonaqueous secondary battery, a solar cell, and the secondary battery protecting circuit.

Since a solar cell can generate an electric power only while a light is radiated to the solar cell, it is difficult to stably drive an electronic apparatus by the solar cell itself. A method in which hybrid power source equipment is configured by combining a solar cell and a secondary battery with each other, and the secondary battery is used as an electric power buffer is known as a method of stably driving an electronic apparatus. With this method, while an amount of electricity used in the electronic apparatus exceeds an electric-generating capacity of the solar cell, the electronic apparatus is driven by using both the solar cell and the secondary battery. On the other hand, when the amount of electricity used in the electronic apparatus fall below the electric-generating capacity of the solar cell, the secondary battery is charged with an excess electric power from the solar cell. Using such hybrid power source equipment results in that there is no necessity for causing a power generating ability of the solar cell to correspond to an amount of maximum power consumption of the electronic apparatus. Thus, it is only necessary to supply an average amount of electric power from the solar cell to the electronic apparatus. This means that a size of a solar cell module can be miniaturized. Thus, a hybrid technology with which both the stable supply of the electric power, and the miniaturization can be realized can be said as a technology which is very effective for the electronic apparatus which is aimed to be miniaturized and portable.

Now, in the hybrid power source equipment, the safety following a rise of a temperature of the secondary battery needs to be sufficiently taken into consideration. The reason for this is because the possibility that the electronic apparatus loaded with the solar cell is positively exposed to the solar light is high. For example, in the case of a car in a midsummer, there is the possibility that the electronic apparatus is left on a dashboard in the hot sun. In addition thereto, there is feared the generation of the damage of the secondary battery following the large and abrupt rise of the temperature of the inside of the electronic apparatus.

SUMMARY

An overcharge protecting circuit for protecting a secondary battery when a charge voltage value of the secondary battery exceeds a full charge voltage value, for example, is well known from Japanese Patent Laid-Open No. 2008-220110. In addition, a technique for inhibiting deterioration of a battery in a phase of preserving a lithium ion battery at a high temperature by suitably carrying out the discharge is disclosed in Japanese Patent Laid-Open No. 2003-217687. However, with the technique disclosed in Japanese Patent Laid-Open No. 2003-217687, the lithium ion battery is operated only when the lithium ion battery is not set in the charge/discharge state. Also, the technique disclosed in Japanese Patent Laid-Open No. 2003-217687 aims at preventing the deterioration of the lithium ion battery. A technique which fulfills safety measures when the charge voltage value of the secondary battery exceeds the full charge voltage value, and safety measures for the rise of the temperature of the secondary battery at the same time is not disclosed in any of Japanese Patent Laid-Open Nos. 2008-220110 and 2003-217687 at all.

The present disclosure has been made in order to solve the problems described above, and it is therefore desirable to provide a secondary battery protecting circuit for protecting a secondary battery either when a charge voltage value of the secondary battery exceeds a full charge voltage value, or when a temperature of the secondary battery rises, and hybrid power source equipment including the same.

In order to attain the desire described above, according to an embodiment of the present disclosure, there is provided a secondary battery protecting circuit including: a secondary battery protecting circuit connected in parallel with a nonaqueous secondary battery, the secondary battery protecting circuit including:

(A) a first voltage detecting circuit;
(B) a second voltage detecting circuit;
(C) a switch section; and
(D) a heat radiating section.

In the secondary battery protecting circuit, the first voltage detecting circuit is composed of a first resistance voltage-dividing circuit connected in parallel with the secondary battery, having a temperature detecting section and including a voltage outputting portion, and a first circuit whose input portion is connected to the voltage outputting portion of the first resistance voltage-dividing circuit and which is turned ON when a voltage in the input portion is equal to or higher than a first reference voltage value, the second voltage detecting circuit is composed of a second resistance voltage-dividing circuit connected in parallel with the secondary battery and including a voltage outputting portion, and a second circuit whose input portion is connected to the voltage outputting portion of the second resistance voltage-dividing circuit and which is turned ON when a voltage in the input portion is equal to or higher than a second reference voltage value, the switch section and the heat radiating section are connected in series with each other, and the switch section and the heat radiating section connected in series are connected in parallel with the secondary battery, an operation of the switch section is controlled in accordance with outputs from the first circuit and the second circuit, and when one of or both of the first circuit and the second circuit are held in the ON state, the switch section is kept in a conduction state, and an electric power accumulated in the secondary battery is transformed into heat by the heat radiating section.

In order to attain the desire described above, according to another embodiment of the present disclosure, there is provided hybrid power source equipment, including:

(a) a nonaqueous secondary battery;

(b) a secondary battery protecting circuit connected in parallel with the secondary battery; and (c) a solar cell connected to the secondary battery.

In the hybrid power source equipment, the secondary battery protecting circuit is composed of above described secondary battery protecting circuit according to the present disclosure.

As set forth hereinabove, according to the present disclosure, either in the secondary battery protecting circuit, or in the secondary battery protecting circuit included in the hybrid power source equipment, the first voltage detecting circuit is provided with the temperature detecting section and the first circuit. Also, the second voltage detecting circuit is provided with the second circuit. When one of or both of the first circuit and the second circuit are held in the ON state, the switch section is kept in the conduction state, and thus the electric power accumulated in the secondary battery is transformed into the heat by the heat radiating section to be abandoned as the heat. That is to say, the second voltage detecting circuit functions as a protecting circuit when the charge voltage value of the secondary battery exceeds either the safe (proper) full charge voltage value or the voltage value with which the overcharge state is caused. In addition, the first voltage detecting circuit functions as a protecting circuit for reducing either the safe full charge voltage set value or the set voltage value with which the overcharge is caused when the temperature of the secondary battery rises. As a result, it is possible to attain the high safety of the secondary battery.

DETAILED DESCRIPTION OF THE PREFERRED EMBODIMENTS

Figure 1A:
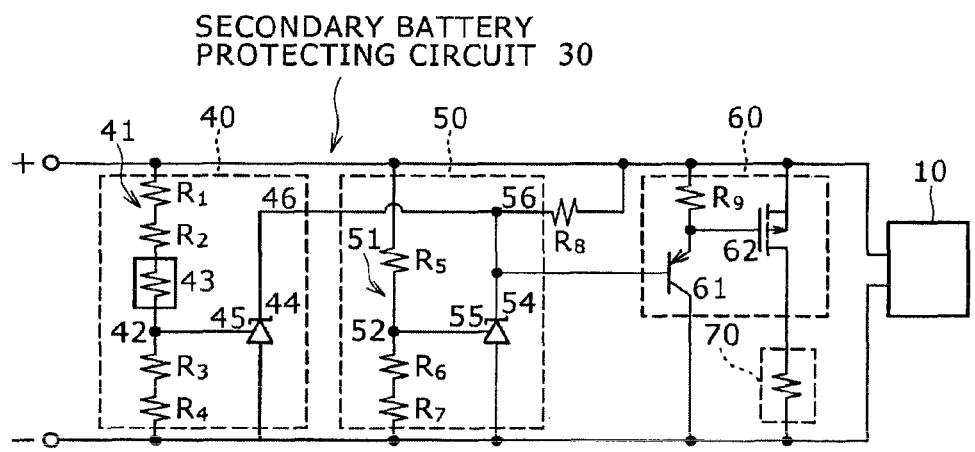
FIGS. 1A and 1B are a circuit diagram of a secondary battery protecting circuit according to Embodiment 1 of the present disclosure, and a conceptual diagram of hybrid power source equipment according to Embodiment 2 of the present disclosure, respectively.

Although the preferred embodiments of the present disclosure will be described in detail hereinafter with reference to the accompanying drawings, the present disclosure is by no means limited thereto, and also various numerical values and materials in the embodiments are merely exemplified. It is noted that the description will be given below in accordance with the following order.

1. Description of the Whole of Secondary Battery Protecting Circuit and Hybrid Power Source Equipment of the Disclosure 2. Embodiments 1 and 2 (Secondary Battery Protecting Circuit and Hybrid Power Source Equipment of the Disclosure), and Others 1. Description of the Whole of Secondary Battery Protecting Circuit and Hybrid Power Source Equipment of the Disclosure In a secondary battery protecting circuit of the present disclosure, or a secondary battery protecting circuit included in hybrid power source equipment of the present disclosure (hereinafter collectively referred to as "a secondary battery protecting circuit or the like of the present disclosure"), it is possible to adopt such a form that either when an output voltage value from a voltage outputting portion of a first resistance voltage-dividing circuit becomes equal to or larger than a first reference voltage value $V_{REF-1}$ depending on a temperature detected by a temperature detecting section, or when an output voltage value from a voltage outputting portion of a second resistance voltage-dividing circuit becomes equal to or larger than a second reference voltage value $V_{REF-2}$, one of or both of a first circuit and a second circuit are held in an ON state. Note that, the first reference voltage value $V_{REF-1}$ is either an internal reference voltage value which the first circuit has, or an output voltage value from a voltage reference IC. The second reference voltage value $V_{REF-2}$ is either an internal reference value which the second circuit has, or an output voltage value from the voltage reference IC. It is only necessary to set each of the first and second reference voltage values $V_{REF-1}$ and $V_{REF-2}$ either as a voltage value corresponding to a voltage value with which an overcharge state is not caused in the secondary battery at a reference temperature (for example, 40° C.) or as a voltage value corresponding to a safe full charge voltage value of the secondary battery.

In the secondary battery protecting circuit of the present disclosure including the preferred form described above, it is possible to adopt such a configuration that the temperature detecting section is preferably composed of a thermistor, and is more preferably composed of a thermistor having a negative temperature coefficient (that is, an NTC type thermistor whose electrical resistance value is reduced with a rise in temperature). In the secondary battery protecting circuit of the present disclosure including these preferred forms and configurations, it is possible to adopt such a configuration that the heating section is composed of a resistor. In addition, in the secondary battery protecting circuit of the present disclosure including these preferred forms and configurations, it is possible to adopt such a configuration that the switch section is composed of a transistor. Note that, when the switch section is composed of a Field Effect Transistor (FET), it is only necessary to input a logical sum of the output from the first circuit and the output from the second circuit to a gate terminal of the FET. On the other hand, when the switch section is composed of a bipolar transistor, it is only necessary to input the logical sum of the output from the first circuit and the output from the second circuit to a base terminal of the bipolar transistor. Either the first circuit or the second circuit, for example, can be composed of a shunt regulator, or can also be composed of a combination of an operational amplifier and a voltage reference IC, a combination of a comparator and a voltage reference IC, or a combination of a transistor and the voltage reference IC.

In addition, although in the secondary battery protecting circuit of the present disclosure or the hybrid power source equipment of the present disclosure including the preferred forms and configurations described above, a lithium ion battery having a well-known structure and a well-known construction can be given as a nonaqueous (nonaqueous electrolyte) battery, the present disclosure is by no means limited thereto. In addition thereto, a magnesium battery or an aluminum ion battery can also be given as the nonaqueous (nonaqueous electrolyte) battery.

In addition, a silicon system solar cell, or an organic system solar cell including a compound system solar cell, a dye-sensitized solar cell or an organic thin film solar cell can be given as the solar cell including a modularized solar cell. In addition to the solar cell, a fuel battery or vibration power-generating equipment can be given as a power source in the secondary battery protecting circuit of the present disclosure. The hybrid power source equipment of the present disclosure, for example, can be incorporated in a car navigation system, various audio devices including portable type one, a mobile phone, various information terminals including a smart phone, a notebook type personal computer, a mobile type personal computer, a Personal Digital Assistant (PDA), a game machine, an electronic paper such as an electronic book or an electronic newspaper, an electronic calculator, a watch, or various home electric appliances. Or, the solar power-generating equipment of the present disclosure can be used as a power source of any of these electronic apparatuses.

2. Embodiments 1 and 2

Figure 1B:
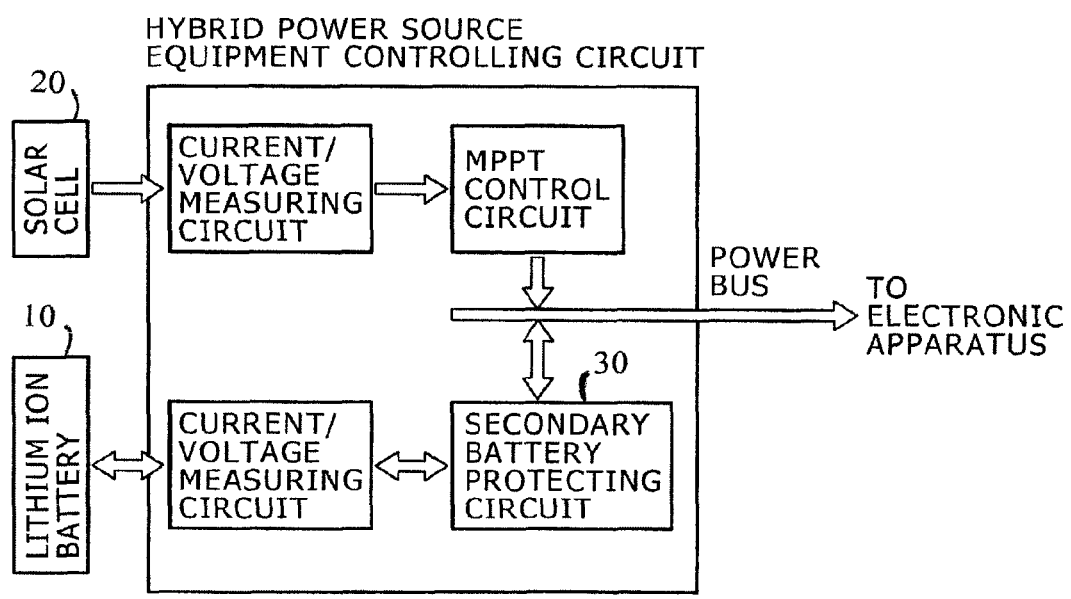

Embodiments 1 and 2 relate to a secondary battery protecting circuit and hybrid power source equipment of the present disclosure, respectively. FIGS. 1A and 1B show a circuit diagram of the secondary battery protecting circuit according to Embodiment 1 of the present disclosure, and a conceptual diagram of the hybrid power source equipment according to Embodiment 2 of the present disclosure, respectively. It is noted that an illustration of a current/voltage measuring circuit and an MPPT control circuit both shown in FIG. 1B is omitted in FIG. 1A.

The hybrid power source equipment of Embodiment 2 is composed of:

(a) a nonaqueous (nonaqueous electrolyte) secondary battery (specifically, a lithium ion battery) 10;

(b) a secondary battery protecting circuit 30 connected in parallel with the secondary battery 10; and (c) a solar cell (specifically, a dye-sensitized solar cell) 20 connected in parallel with the secondary battery 10.

The secondary battery protecting circuit 30 includes:

(A) a first voltage detecting circuit 40;

(B) a second voltage detecting circuit 50;

(C) a switch section 60; and (D) a heat radiating section 70.

The first voltage detecting circuit 40 is composed of a first resistance voltage-dividing circuit 41 connected in parallel with the secondary battery 10, and a first circuit (specifically, a first shunt regulator 44). The first resistance voltage-dividing circuit 41 includes a temperature detecting section 43 and a voltage outputting portion 42. An input portion 45 of the first shunt regulator (first circuit) 44 is connected to the voltage outputting portion 42 of the first resistance voltage-dividing circuit 41. When a voltage at the input portion 45 is equal to or higher than a first reference voltage value $V_{REF-1}$, the first shunt regulator 44 is turned ON. The temperature detecting section 43 is composed of a thermistor, more specifically, an NTC type thermistor having a negative temperature coefficient. The first resistance voltage-dividing circuit 41, although not limited, is composed of four resistors $R_1, R_2, R_3$, and $R_4$ connected in series. The voltage outputting portion 42 is provided between the resistor $R_2$ and the resistor $R_3$. For example, in the resistor $R_1$ and the resistor $R_2$, one resistor has an electrical resistance value which is about two orders of magnitude larger than that of the other resistor. In the resistor $R_3$ and the resistor $R_4$ as well, one resistor has an electrical resistance value which is about two orders of magnitude larger than that of the other resistor. Thus, the electrical resistance values of these resistors $R_1, R_2, R_3$, and $R_4$ are adjusted, whereby it is possible to carry out a fine adjustment for a voltage value outputted from the voltage outputting portion 42.

The second voltage detecting circuit 50 is composed of a second resistance voltage-dividing circuit 51 connected in parallel with the secondary battery 10, and a second circuit (specifically, a second shunt regulator 54). The second resistance voltage-dividing circuit 51 includes a voltage outputting portion 52. An input portion 55 of the second shunt regulator (second circuit) 54 is connected to the voltage outputting portion 52 of the second resistance voltage-dividing circuit 51. When a voltage at the input portion 55 is equal to or higher than a second reference voltage value $V_{REF-2}$, the second shunt regulator 54 is turned ON. The second resistance voltage-dividing circuit 51, although not limited, is composed of three resistors $R_5, R_6$ and $R_7$ connected in series. The voltage outputting portion 52 is provided between the resistor $R_5$ and the resistor $R_6$. In the resistor $R_6$ and the resistor $R_7$, one resistor has a larger electrical resistance value than that of the other resistor. The electrical resistance values of three resistors $R_5, R_6$ and $R_7$ are adjusted, whereby it is possible to carry out a fine adjustment for a voltage value outputted from the voltage outputting portion 52.

The switch section 60 and the heat radiating section 70 are connected in series with each other, and the switch section 60 and the heat radiating section 70 connected in series are connected in parallel with the secondary battery 10. The heat radiating section 70 is composed of a resistor (for example, specification: 22Ω and 0.9 W). The switch section 60 is composed of a PNP transistor 61 and an FET (P-channel MOSFET) 62. Each of the output portion 46 of the first shunt regulator 44, and the output portion 56 of the second shunt regulator 54 is connected to a base terminal of the PNP transistor 61, and is also connected to one terminal of the secondary battery 10 through a resistor $R_8$. An emitter terminal of the PNP transistor 61 is connected to the one terminal of the secondary battery 10 through a resistor $R_9$, and is also connected to a gate terminal of the P-channel MOSFET 62. On the other hand, a collector terminal of the PNP transistor 61 is connected to the other terminal of the secondary battery 10. One source/drain region of the P-channel MOSFET 62 is connected to the one terminal of the secondary battery 10, and the other source/drain region of the P-channel MOSFET 62 is connected to one terminal of the heat radiating section 70. The other terminal of the heat radiating section 70 is connected to the other terminal of the secondary battery 10.

Also, the operation of the switch section 60 is controlled in accordance with the output from the first shunt regulator 44, and the output from the second shunt regulator 54. When one of or both of the first shunt regulator 44 (first circuit) and the second shunt regulator 54 (second circuit) are held in an ON state, the switch section 60 is kept in a conduction state. Thus, the electric power accumulated in the secondary battery 10 is transformed into the heat by the heat radiating section 70 to be abandoned as the heat.

More specifically, when an output voltage value $V_{out-1}$ from the voltage outputting portion 42 of the first resistance voltage-dividing circuit 41 becomes equal to or higher than the first reference voltage value $V_{REF-1}$ (for example, 1.24 V) depending on the temperature detected by the temperature detecting section (NTC type thermistor) 43, that is, depending on a change in electrical resistance value of the temperature detecting section 43, or when an output voltage value $V_{out-2}$ from the voltage outputting portion 52 of the second resistance voltage-dividing circuit 51 becomes equal to or higher than the second reference voltage value $V_{REF-2}$ (for example, 1.24 V), one of or both of the first shunt regulator 44 and the second shunt regulator 54 are turned ON. In other words, the first shunt regulator 44 and the second shunt regulator 54 configure a kind of "OR" circuit.

Figure 2:
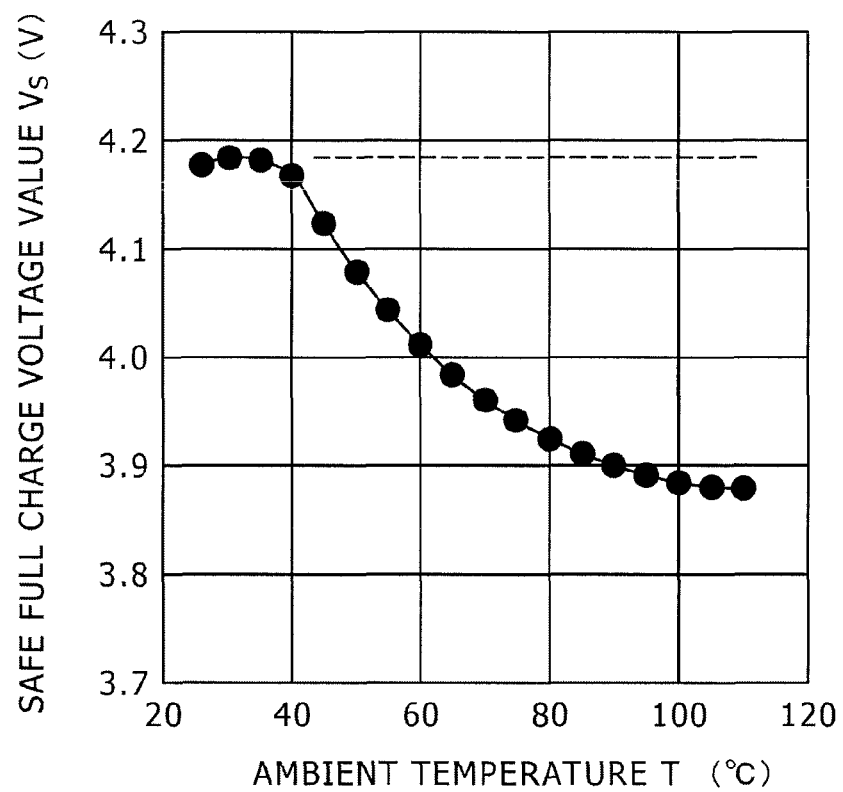
FIG. 2 is a graph representing a relationship between an ambient temperature and a safe full charge voltage value.

A relationship between an ambient temperature T and a safe (proper) full charge voltage value $V_s$ of the secondary battery 10 is exemplified in FIG. 2. When the ambient temperature T is equal to or lower than 40° C., the safe full charge voltage value $V_s$ is 4.18 V. However, when the ambient temperature T rises up to 60° C., the safe full charge voltage value $V_s$ is reduced to 4.01 V. When the ambient temperature T rises up to 80° C., the safe full charge voltage value $V_s$ is reduced to 3.93 V. Also, when the ambient temperature T rises up to 100° C., the safe full charge voltage value $V_s$ is reduced to 3.88 V.

The second reference voltage value $V_{REF-2}$ is an internal reference voltage value which the second shunt regulator 54 has. It is only necessary to set the second reference voltage value $V_{REF-2}$ either as a voltage value corresponding to a voltage value with which an overcharge state is not caused in the secondary battery 10 at a reference temperature (for example, 40° C.) or as a voltage value corresponding to the safe full charge voltage value of the secondary battery 10. Specifically, the second reference voltage value $V_{REF-2}$, for example, has to be made to agree with the output voltage value $V_{out-2}$ from the voltage outputting portion 52 of the second resistance voltage-dividing circuit 51 when a charge voltage value (that is, a voltage value inputted (applied) to the second resistance voltage-dividing circuit 51) $V_{in}$ is 4.18 V. Or, the electrical resistance values of the resistors $R_5$, $R_6$ and $R_7$ have to be adjusted so that when the charge voltage value $V_{in}$ of the secondary battery 10 is 4.18 V, the output voltage value $V_{out-2}$ from the voltage outputting portion 52 of the second resistance voltage-dividing circuit 51 agrees with the second reference voltage value $V_{REF-2}$.

The first reference voltage value $V_{REF-1}$ is an internal reference voltage value which the first shunt regulator 44 has. Similarly to the case of the second reference voltage value $V_{REF-2}$, it is only necessary to set the first reference voltage value $V_{REF-1}$ either as a voltage value corresponding to a voltage value with which an overcharge state is not caused in the secondary battery 10 at the reference temperature (for example, 40° C.) or as a voltage value corresponding to the safe full charge voltage value of the secondary battery 10. As described above, the safe full charge voltage value of the secondary battery 10 has such a negative temperature dependency that the safe full charge voltage value is reduced with a rise of the ambient temperature. On the other hand, the temperature detecting section (NTC type thermistor) 43 also has such a negative temperature dependency that the electrical resistance value thereof is reduced with a rise of the temperature. Therefore, for example, since the safe full charge voltage value is reduced to 4.01 V when the ambient temperature becomes 60° C., it is only necessary to select the temperature detecting section 43 having such characteristics that when the charge voltage value (that is, the voltage value inputted (applied) to the first resistance voltage-dividing circuit 41) $V_{in}$ of the secondary battery 10 is 4.01 V, the output voltage value $V_{out-1}$ from the voltage outputting portion 42 of the first resistance voltage-dividing circuit 41 becomes equal to the first reference voltage value $V_{REF-1}$. Or, it is only necessary to adjust the electrical resistance values of the resistors $R_1$, $R_2$, $R_3$, and $R_4$ so that when the charge voltage value $V_{in}$ of the secondary battery 10 is 4.01 V, the output voltage value $V_{out-1}$ from the voltage outputting portion 42 of the first resistance voltage-dividing circuit 41 agrees with the first reference voltage value $V_{REF-1}$. In general, if the safe full charge voltage value when the ambient temperature is T ° C. is taken to be $T_{s-T}$, it is only necessary to select the temperature detecting section 43 having such characteristics that when the charge voltage value $V_{in}$ of the secondary battery 10 is equal to the safe full charge voltage value $V_{s-T}$, the output voltage value $V_{out-1}$ from the voltage outputting portion 42 of the first resistance voltage-dividing circuit 41 becomes equal to the first reference voltage value $V_{REF-1}$. Or, it is only necessary to adjust the electrical resistance values of the resistors $R_1$, $R_2$, $R_3$, and $R_4$ so that when the charge voltage value $V_{in}$ of the secondary battery 10 is equal to the safe full charge voltage value $V_{s-T}$, the output voltage value $V_{out-1}$ from the voltage outputting portion 42 of the first resistance voltage-dividing circuit 41 becomes equal to the first reference voltage value $V_{REF-1}$. Or, it is only necessary to carry out the selection of the temperature detecting section 43, and the adjustment of the electrical resistance values of the $R_1$, $R_2$, $R_3$, and $R_4$ in combination with each other.

Figure 3:
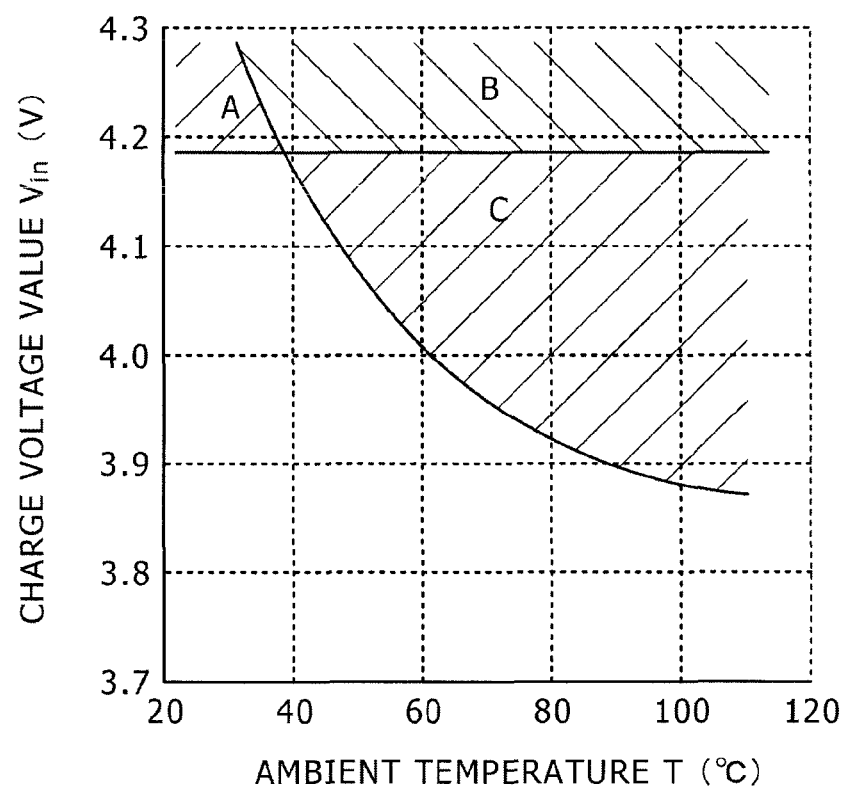
FIG. 3 is a graph representing a relationship between the ambient temperature and a charge voltage value in which a region in which one of or both of a first circuit and a second circuit are held in an ON state (conduction state) is schematically indicated by slant lines.

FIG. 3 schematically shows a relationship between the ambient temperature T and the charge voltage value $V_{in}$. In FIG. 3, when the charge voltage value $V_{in}$ of the secondary battery 10 exists in any of regions "A," "B" and "C," one of or both of the first shunt regulator 44 and the second shunt regulator 54 are held in the ON state. As a result, the electric power accumulated in the secondary battery 10 is transformed into the heat by the heat radiating section 70 to be abandoned as the heat.

The secondary battery protecting circuit of the Embodiment 1 is connected in parallel with the nonaqueous secondary battery in such a manner and includes the first voltage detecting circuit, the second voltage detecting circuit, the switch section, and the heat radiating section. The first voltage detecting circuit connected in parallel with the secondary battery has the temperature detecting section. Also, when one of or both of the second voltage detecting circuit and the first voltage detecting circuit connected in parallel with the secondary battery are held in the ON state, the switch section is kept in the conduction state. As a result, the electric power accumulated in the secondary battery is transformed into the heat by the heat radiating section. That is to say, in the secondary battery protecting circuit of the Embodiment 1, or in the secondary battery protecting circuit included in the hybrid power source equipment of the Embodiment 2, the second voltage detecting circuit functions as the protecting circuit when the charge voltage value of the secondary battery exceeds the safe full charge voltage value. Also, the first voltage detecting circuit functions the protecting circuit for reducing the safe full charge voltage set value when the temperature of the secondary battery rises. Therefore, it is possible to ensure the high safety of the secondary battery. In addition thereto, since the secondary battery protecting circuit monitors the charge voltage value of the secondary battery on a steady basis, the secondary battery protecting circuit operates as soon as the charge voltage value of the secondary battery exceeds the safe full charge voltage value a little. For this reason, it is possible to ensure the higher safety and also the secondary battery protecting circuit has the less power consumption. Moreover, the resistor having the small electrical resistance value can be used as the heat radiating section.

Although the present disclosure has been described so far based on the preferred embodiments, the present disclosure is by no means limited thereto. The configurations and structures of the secondary battery protecting circuit, the secondary battery, the solar cell, and the hybrid power source equipment which have been described in the Embodiment 1 and the Embodiment 2 are merely exemplified, and thus can be suitably changed. For example, although in the embodiments, the switch section is composed of the two transistors, the switch section can also be composed of one transistor, and the number of the resistors composing the first resistance voltage-dividing circuit and the second resistance voltage-dividing circuit can also be suitably changed. The first voltage detecting circuit, the second voltage detecting circuit and the switch section can be composed of so-called discrete components, or for example, can be composed of one integrated circuit.

It should be understood by those skilled in the art that various modifications, combinations, sub-combinations and alternations may occur depending on design requirements and other factors insofar as they are within the scope of the appended claims or the equivalent thereof.

What is claimed is:

1. Hybrid power source equipment, comprising:
a nonaqueous secondary battery;
a secondary battery protecting circuit connected in parallel with said secondary battery; and
a solar cell connected to said secondary battery,
said secondary battery protecting circuit including
a first voltage detecting circuit,
a second voltage detecting circuit,
a switch section, and
a heat radiating section, wherein
said first voltage detecting circuit comprises a first resistance voltage-dividing circuit connected in parallel with said secondary battery, having a temperature detecting section and including a voltage outputting portion, and a first circuit whose input portion is connected to said voltage outputting portion of said first resistance voltage-dividing circuit and which turns ON in response to a voltage in said first circuit input portion being greater than or equal to a first reference voltage value,
said second voltage detecting circuit comprises a second resistance voltage-dividing circuit connected in parallel with said secondary battery and including a voltage outputting portion, and a second circuit whose input portion is connected to said voltage outputting portion of said second resistance voltage-dividing circuit and which turns ON in response to a voltage in said second circuit input portion being greater than or equal to a second reference voltage value,
said switch section and said heat radiating section are connected in series with each other and are connected in parallel with said secondary battery,
said switch section operates in response to outputs from said first circuit and said second circuit, and
when at least one of said first circuit and said second circuit is in an ON state, said switch section is in a conduction state, and an electric power accumulated in said secondary battery is transformed into heat by said heat radiating section.

2. The hybrid power source equipment according to claim 1, wherein either when an output voltage value from said voltage outputting portion of said first resistance voltage-dividing circuit becomes greater than or equal to the first reference voltage value depending on a temperature detected by said temperature detecting section, or when an output voltage value from said voltage outputting portion of said second resistance voltage-dividing circuit becomes greater than or equal to the second reference voltage value, at least one of said first circuit and said second circuit is in the ON state.

3. The hybrid power source equipment according to claim 1, wherein said temperature detecting section comprises a thermistor.

4. The hybrid power source equipment according to claim 1, wherein said heat radiating section comprises a resistor.

5. The hybrid power source equipment according to claim 1, wherein said switch section comprises a transistor.

6. The hybrid power source equipment according to claim 1, wherein said secondary battery comprises a lithium ion battery.

* * * * *